UNITED STATES PATENT OFFICE.

ARCHIBALD S. B. LITTLE, OF NASHVILLE, TENNESSEE.

PAINT COMPOSITION AND PROCESS OF MAKING THE SAME.

1,072,476. Specification of Letters Patent. Patented Sept. 9, 1913.

No Drawing. Application filed October 16, 1912. Serial No. 726,051.

*To all whom it may concern:*

Be it known that I, ARCHIBALD S. B. LITTLE, a subject of the King of Great Britain, residing at Nashville, in the county of Davidson and State of Tennessee, have invented a new and useful Paint Composition and Process of Making the Same, of which the following is a specification.

The paint forming the subject-matter of the present invention has special application in connection with the shell of gas-holders or gasometers. This shell dips as is well known into a body of water more or less saturated with light oils such as hydrocarbon oils, benzol, and the like deposited thereon by condensation from the carbureted water-gas.

The object of my invention is to produce a paint which when spread over the surface of the gasometer shell, will resist the action of these oils, the coat of paint being thus left unimpaired and protecting the metal of which the shell is constructed.

The process or method of compounding the ingredients of the paint may be described as follows:—To prepare the vehicle of my compound I dissolve for example fifty (50) pounds of rosin in its own weight of petroleum spirit such as gasolene, benzin (or equivalent hydrocarbon). I then heat 50 pounds of linseed oil (raw or boiled) with five (5) pounds of red lead and five (5) pounds of litharge to a consistence such as to solidify on cooling. This mixture (of linseed oil, red lead, and litharge) while hot is dissolved in fifty (50) pounds of turpentine. This solution is then mixed with the solution of rosin in the petroleum spirit referred to and serves as the vehicle. To make a durable paint, a proper proportion (to suit the painter) of Venetian red (red oxid, or equivalent mineral or carbon pigments or any combination of the same) is added; and if it be desired that the paint shall dry quickly it may be thinned with gasolene, and just before applying, adding a little red lead thinned down with sufficient boiled linseed oil to cause the mixture to pass through a 120 mesh sieve before running it into the bulk, stirring the latter during admixture. To the mass (with or without the final admixture of strained red lead aforesaid) is added about four (4) per cent. by weight of zinc chromate, when the compound is ready for use.

If the ingredients are mixed in smaller quantities, the same relative proportions by weight as outlined above should be adhered to, the specific weights given serving merely as an example. To maintain the proper relative proportions, and at the same time vary the weights of the ingredients, would obviously fall within the purview of the practical painter.

Having described my invention, what I claim is:—

1. In the manufacture of paint, the process of dissolving a quantity of resin in a hydrocarbon, then heating a quantity of linseed oil mixed with red lead and litharge to a consistence such that the mass solidifies on cooling, dissolving said mass while hot in a suitable quantity of turpentine, and adding the solution to the original solution of resin and hydrocarbon.

2. In the manufacture of paint, the process of dissolving a suitable quantity of rosin in its own weight of petroleum spirit, heating a mixture of linseed oil with a quantity of red lead and litharge to a point where the mass solidifies on cooling, dissolving said mass while hot in turpentine, and adding the solution to the original solution of rosin and petroleum spirit.

3. In the manufacture of paint, the process of dissolving fifty pounds of rosin in its own weight of benzin, heating fifty pounds of linseed oil with five pounds of red lead and five pounds of litharge to a point where the mass solidifies on cooling, dissolving said mass while hot in fifty pounds of turpentine, and adding thereto the original solution of rosin in benzin.

4. In a paint composition the combination of a vehicle composed of a solution of fifty pounds of rosin in fifty pounds of benzin, mixed with a solution of fifty pounds of linseed oil solidified with five pounds of red lead and five pounds of litharge, in fifty pounds of turpentine, a pigment mixed therewith, and a metallic chromate forming about four per cent. of the entire mixture.

5. In a paint composition the combination of a vehicle composed of a solution of fifty pounds of rosin in fifty pounds of benzin, mixed with a solution of fifty pounds of linseed oil solidified with five pounds of red lead and five pounds of litharge, in fifty pounds of turpentine, an insoluble pigment mixed therewith, and four per cent. by weight of the entire mass, of zinc chromate.

6. In a paint composition the combination of a vehicle composed of a solution of fifty pounds of rosin in fifty pounds of benzin, mixed with a solution of fifty pounds of linseed oil solidified with five pounds of red lead and five pounds of litharge, in fifty pounds of turpentine, a mineral pigment mixed therewith, a gasolene thinner, and four per cent. by weight of the mass, of zinc chromate.

7. In a paint composition the combination of a vehicle composed of a solution of fifty pounds of rosin in fifty pounds of benzin, mixed with a solution of fifty pounds of linseed oil solidified with five pounds of red lead and five pounds of litharge, in fifty pounds of turpentine, a mineral pigment mixed therewith, a gasolene thinner, red lead thinned with boiled linseed oil to cause the mixture to pass through a 120 mesh sieve, and substantially four per cent. of zinc chromate.

In testimony whereof I affix my signature, in presence of two witnesses.

ARCHIBALD S. B. LITTLE.

Witnesses:
GILBERT LITTLE,
NATALIE L. GABRIEL.

Copies of this patent may be obtained for five cents each, by addressing the "Commissioner of Patents, Washington, D. C."